United States Patent
Behrens et al.

(10) Patent No.: US 12,239,156 B2
(45) Date of Patent: *Mar. 4, 2025

(54) SYSTEMS AND METHODS FOR IMPROVING THE PERFORMANCE OF CEREAL USING A SILK FIBROIN SOLUTION AND POWDERS CONTAINING SILK FIBROIN

(71) Applicant: Cambridge Crops, Inc., Boston, MA (US)

(72) Inventors: Adam Behrens, Boston, MA (US); Sezin Yigit, Arlington, MA (US); Laith Abu-Taleb, Gaithersburg, MD (US); Ryan Ellis, Washington, DC (US); Jesse Groner, Cambridge, MA (US)

(73) Assignee: Cambridge Crops, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,797

(22) Filed: Nov. 10, 2023

(65) Prior Publication Data
US 2024/0074471 A1 Mar. 7, 2024

Related U.S. Application Data (63) Continuation of application No. 17/820,103, filed on Aug. 16, 2022, now Pat. No. 11,864,569.
(Continued)

(51) Int. Cl.
*A23L 7/122* (2016.01)
*A23L 5/10* (2016.01)
(Continued)

(52) U.S. Cl.
CPC ............... *A23L 7/122* (2016.08); *A23L 5/10* (2016.08); *A23L 7/174* (2016.08); *A23P 30/20* (2016.08); *A23V 2002/00* (2013.01)

(58) Field of Classification Search
CPC .. A23L 7/122; A23L 5/10; A23L 7/174; A23P 30/20
See application file for complete search history.

(56) References Cited

U.S. PATENT DOCUMENTS

| | | | |
|---|---|---|---|
| 3,246,990 | A | 4/1966 | Thompson et al. |
| 3,464,827 | A | 9/1969 | Tsuchiya et al. |

(Continued)

FOREIGN PATENT DOCUMENTS

| | | |
|---|---|---|
| CN | 103739691 A | 4/2014 |
| EP | 0352330 A1 | 1/1990 |

(Continued)

OTHER PUBLICATIONS

Ajisawa, "Dissolution of silk fibroin with calcium chloride/ethanol aqueous solution," J. Seric. Sci. Jpn., 67(2):91-94, (1998).
(Continued)

*Primary Examiner* — Katherine D Leblanc
(74) *Attorney, Agent, or Firm* — Womble Bond Dickinson (US) LLP; John V. Forcier (57) ABSTRACT

The disclosure relates to products and methods for improving the performance of cereal manufactured with silk solutions and powders containing silk fibroin obtained from silk inputs. The coatings, or otherwise incorporated silk fibroin, can be used to improve the shelf life of cereals, reduce the glycemic index of cereals, and to improve the performance of those cereals in areas valued by consumers.

23 Claims, 7 Drawing Sheets
(7 of 7 Drawing Sheet(s) Filed in Color)

Related U.S. Application Data (60) Provisional application No. 63/233,513, filed on Aug. 16, 2021.

(51) Int. Cl.
    *A23L 7/174*           (2016.01)
    *A23P 30/20*          (2016.01)

(56) References Cited

U.S. PATENT DOCUMENTS

| | | |
|---|---|---|
| 4,233,212 A | 11/1980 | Otoi et al. |
| 4,608,203 A | 8/1986 | Akasaka et al. |
| 4,940,662 A | 7/1990 | Yamazaki et al. |
| 5,853,764 A | 12/1998 | Tsubouchi |
| 6,592,794 B1 | 7/2003 | Bachrach |
| 6,800,310 B2 | 10/2004 | Squire et al. |
| 7,553,634 B1 | 6/2009 | Lakhotia et al. |
| 8,309,689 B2 | 11/2012 | Yang et al. |
| 8,354,501 B2 | 1/2013 | Kaplan et al. |
| 9,175,052 B2 | 11/2015 | Gerardi et al. |
| 9,731,052 B2 | 8/2017 | Kaplan et al. |
| 9,925,299 B2 | 3/2018 | Kaplan et al. |
| 10,271,561 B2 | 4/2019 | Omenetto et al. |
| 10,433,574 B2 | 10/2019 | Froseth et al. |
| 10,533,037 B2 | 1/2020 | Wang et al. |
| 2005/0197496 A1 | 9/2005 | Perreault |
| 2006/0273279 A1 | 12/2006 | Kaplan et al. |
| 2008/0166469 A1 | 7/2008 | Schweizer et al. |
| 2009/0110651 A1 | 4/2009 | Moussou et al. |
| 2011/0014287 A1 | 1/2011 | Altman et al. |
| 2014/0378661 A1 | 12/2014 | Lo et al. |
| 2015/0183841 A1 | 7/2015 | Lo et al. |
| 2015/0337008 A1 | 11/2015 | Montagner et al. |
| 2016/0046679 A1 | 2/2016 | Kluge et al. |
| 2016/0185817 A1 | 6/2016 | Zhu et al. |
| 2016/0206780 A1 | 7/2016 | Wang |
| 2016/0215030 A1 | 7/2016 | Bressner et al. |
| 2017/0245508 A1 | 8/2017 | Yang et al. |
| 2018/0110256 A1 | 4/2018 | Melonas et al. |
| 2018/0310604 A1 | 11/2018 | Rubin |
| 2018/0352833 A1 | 12/2018 | Zhang et al. |
| 2019/0069590 A1 | 3/2019 | Neal et al. |
| 2019/0070088 A1 | 3/2019 | Altman et al. |
| 2019/0309467 A1 | 10/2019 | Altman et al. |
| 2021/0094982 A1 | 4/2021 | Ludemann-Hombourger et al. |
| 2022/0177530 A1 | 6/2022 | Altman |

FOREIGN PATENT DOCUMENTS

| | | |
|---|---|---|
| EP | 1869238 B1 | 7/2009 |
| EP | 2154990 B1 | 6/2013 |
| EP | 2475677 B1 | 8/2018 |
| EP | 2934187 B1 | 7/2019 |
| EP | 3645063 A1 | 5/2020 |
| JP | 2010254596 A | 11/2010 |
| WO | WO-2007016524 A2 | 2/2007 |
| WO | WO-2012145739 A1 | 10/2012 |
| WO | WO-2014145002 A2 | 9/2014 |
| WO | WO-2015134865 A1 | 9/2015 |
| WO | WO-2019094700 A1 | 5/2019 |
| WO | WO-2020028918 A1 | 2/2020 |

OTHER PUBLICATIONS

Ali et al., "Gum arabic as a novel edible coating for enhancing shelf-life and improving postharvest quality of tomato (*Solanum lycopersicum* L.) fruit," Postharvest Biology and Technology, 58:42-47, (2010).

Basal et al., "Antibacterial Properties of Silk Fibroin/Chitosan Blend Films Loaded with Plant Extract," Fibers and Polymers, 11(1):21-27, (2010).

Boulet-Audet et al., "Dry-Spun Silk Produces Native-Like Fibroin Solutions," Biomacromolecules, 17(10):3198-3204, (2016).

Cheng et al., "Differences in regenerated silk fibroin prepared with different solvent systems: From structures to conformational changes," J. Appl. Polym. Sci., 41959:1-8, (2015).

Day, BPF. "Fruit and Vegetables." Principles and Applications of Modified Atmosphere Packaging of Foods, Springer-Verlag, 1993, pp. 114-133.

Freddi et al., "Swelling and dissolution of silk fibroin (*Bombyx mori*) in N-methyl morpholine N-oxide," Int J Biol Macromol, 24(2-3):251-263, (1999).

Fuchs et al., "Effect of Edible Coatings on Postharvest Quality of Fresh Green Asparagus," Journal of Food Processing and Preservation, 32:951-971, (2008).

Furuhata et al., "Dissolution of silk fibroin in lithium halide/organic amide solvent systems," J. Seric. Sci. Jpn., 63(4):315-322, (1994).

Gobin et al., "Structural and mechanical characteristics of silk fibroin and chitosan blend scaffolds for tissue regeneration," J Biomed Mater Res A, 74(3):465-473, (2005).

Gong et al., "Two distinct beta-sheet fibrils from silk protein," Chem Commun (Camb), (48):7506-7508, (2009).

Haggag et al., "Degumming of Silk Using Microwave-Assisted Treatments," Journal of Natural Fibers, 4(3):1-22, (2007).

Hino et al., "Change in secondary structure of silk fibroin during preparation of its microspheres by spraydrying and exposure to humid atmosphere," J Colloid Interface Sci, 266(1):68-73, (2003).

Hu et al., "Determining Beta-Sheet Crystallinity in Fibrous Proteins by Thermal Analysis and Infrared Spectroscopy," Macromolecules, 39:6161-6170, (2006).

International Search Report and Written Opinion for PCT/US19/65268, mailed Mar. 23, 2020.

Jaramillo-Quiceno et al., "Water-annealing treatment for edible silk fibroin coatings from fibrous waste," J. Appl. Polym. Sci, 48505:1-8, (2019).

Kamalha et al., "Analysis of the secondary crystalline structure of regenerated *Bombyx mori* fibroin," RRBS, 7(2):76-83, (2013).

Karen Brimmer, "Sugar Reductions Strategies for Frosted and Coated Cereal", Naturally Colorful, Aug. 16, 2022, https://sensientfoodcolors.com/en-us/dry-grocery/sugar-reduction-strategies-frosted-coated-cereal/.

Khalifa et al., "Application of sericin to modify textile supports," The Journal of Textile Institute, 103(4):370-377, (2012).

Khan et al., "Physical properties and dyeability of silk fibers degummed with citric acid," Bioresour Technol, 101(21):8439-8445, (2010).

Kim et al., "Formulation of Biologically-Inspired Silk-Based Drug Carriers for Pulmonary Delivery Targeted for Lung Cancer," Sci Rep, 5:11878, (2015).

Kimberlee J. Burrington, "Keeping the crunch in breakfast cereals", Natural Products Insider, Jun. 1, 2001, https://www.naturalproductsinsider.com/archive/keeping-crunch-breakfast-cereals.

Kluge et al., "Optimizing molecular weight of lyophilized silk as a shelf-stable source material," ACS Biomater. Sci. Eng., (2016).

Kluge et al., "Silk-based blood stabilization for diagnostics," Proc Natl Acad Sci U S A, 113(21):5892-5897, (2016).

Koh et al., "Structures, mechanical properties and applications of silk fibroin materials," Progress in Polymer Science, 46:86-110, (2015).

Kundu et al., "Isolation and processing of silk proteins for biomedical applications," Int J Biol Macromol, 70:70-77, (2014).

Kweon et al., "Dissolution and Characterization of Regenerated *Antheraea pernyi* Silk Fibroin," Journal of Applied Polymer Science, 82:750-758, (2001).

Li et al., "Silk-based stabilization of biomacromolecules," J Control Release, 219:416-430, (2015).

Li et al., "Regenerated silk materials for functionalized silk orthopedic devices by mimicking natural processing," Biomaterials, 110:24-33, (2016).

Li et al., "Enhanced Stabilization in Dried Silk Fibroin Matrices," Biomacromolecules, 18:2900-2905, (2017).

Li et al., "Fabrication and characterization of microencapsulated n-octadecane with silk fibroin-silver nanoparticles shell for thermal regulation," Journal of Materials Research, 34(12):2047-2056, (2019).

(56) References Cited

OTHER PUBLICATIONS

Lin et al., "Cold plasma treated thyme essential oil/silk fibroin nanofibers against *Salmonella* Typhimurium in poultry meat," Food Packaging and Shelf Life, 21:100337, (2019).
Liu et al., "Exploring the Structural Transformation Mechanism of Chinese and Thailand Silk Fibroin Fibers and Formic-Acid Fabricated Silk Films," Int J Mol Sci, 19(11), 2018).
Lu et al., "Stabilization of Enzymes in Silk Films," Biomacromolecules, 10:1032-1042, (2009).
Lu et al., "Stabilization and Release of Enzymes from Silk Films," Macromol. Biosci., 10:359-368, (2010).
Malay et al., "Relationships between physical properties and sequence in silkworm silks," Sci Rep, 6:27573, (2016).
Marelli et al., "Silk Fibroin as Edible Coating for Perishable Food Preservation," Sci Rep, 6:25263, (2016).
Marelli et al., Supporting Information, "Silk Fibroin as Edible Coating for Perishable Food Preservation," Sci Rep, 6:25263, (2016).
Meng et al., "Controllable in situ synthesis of silver nanoparticles on multilayered film-coated silk fibers for antibacterial application," J Colloid Interface Sci, 461:369-375, (2016).
Meshram et al., "Extraction of lithium from primary and secondary sources by pre-treatment, leaching and separation: A comprehensive review," Hydrometallurgy, 150:192-208, (2014).
Pawcenis et al., "Size exclusion chromatography for analyses of fibroin in silk: optimization of sampling and separation conditions," Appl. Phys. A, 114:301-308, (2014).
Pritchard et al., "Encapsulation of Oil in Silk Fibroin Biomaterials," J. Appl. Polym. Sci., 39990:1-11, (2014).
Rnjak-Kovacina et al., "The effect of sterilization on silk fibroin biomaterial properties," Macromol Biosci, 15(6):861-874, (2015).
Rockwood et al., "Materials fabrication from Bombyx mori silk fibroin," Nat Protoc, 6(10):1612-1631, (2011).
Sah et al., "The extraction of fibroin protein from Bombyx mori silk cocoon: Optimization of process parameters," International Journal of Bioinformatics Research, 2(2):33-41, (2010).
Saha et al., "Extraction, Structural and Functional Properties of Silk Sericin Biopolymer from Bombyx mori Silk Cocoon Waste," J Textile Sci Eng, 9(1):1000390, (2019).
Sashina et al., "Dissolution of Silk Fibroin in N-methylmorpholine-N-oxide and Its Mixtures with Organic Solvents," Russian Journal of Applied Chemistry, 76(1):128-131, (2003).
Sashina et al., "Structure and Solubility of Natural Silk Fibroin," Russian Journal of Applied Chemistry, 79(6) 869-876, (2006).
Shen et al., "Dissolution behavior of silk fibroin in a low concentration CaCl2-methanol solvent: From morphology to nanostructure," Int J Biol Macromol, 113:458-463, (2018).
Silva et al., "Glycerin and Ethanol as Additives on Silk Fibroin Films: Insoluble and Malleable Films," J. Appl. Polym. Sci., (2013).
Sparkes et al., "Analysis of the pressure requirements for silk spinning reveals a pultrusion dominated process," Nat Commun, 8(1):594, (2017).
Srihanam et al., "Silk fibroin microspheres prepared by the water-in-oil emulsion solvent diffusion method for protein delivery," Korean J. Chem. Eng., 28(1):293-297, (2011).
Tabatabai et al., "Acid induced assembly of a reconstituted silk protein system", pp. 1-16, (2018).
Toms et al., "Determination of the Configuration of Silk Fibroin Dissolved in Aqueous Solutions of Lithium Bromide," Nature, 169:877-878, (1952).
USPTO, Third Party Submission Under 37 CFR 1.290 for U.S. Appl. No. 18/075,496, filed Oct. 3, 2023, pp. 1-16.
Vaithanomsat et al., "Production of Water-Soluble Silk Powder from Bombyx mori Lin. (Nang-Noi Srisakate 1)," Kasetsart J. (Nat. Sci.), 40:152-158, (2006).
Vepari et al., "Silk as a Biomaterial," Prog Polym Sci, 32(8-9):991-1007, (2007).
Wang et al., "Colloidal Stability of Silk Fibroin Nanoparticles Coated with Cationic Polymer For Effective Drug Delivery," ACS Appl Mater Interfaces, 7(38):21254-21262, (2015).
Wang et al., "Effect of silk degumming on the structure and properties of silk fibroin," The Journal of the Textile Institute, (2018).
World Intellectual Property Organization, International Search Report for PCT/US2022/070619, May 24, 2022.
Wray et al., "Effect of processing on silk-based biomaterials: reproducibility and biocompatibility," J Biomed Mater Res B Appl Biomater, 99(1):89-101, (2011).
Wu et al., "Control of silk microsphere formation using polyethylene glycol (PEG)," Acta Biomaterialia, (2016).
Wu et al., "Nanofiltration recovery of sericin from silk processing waste and synthesis of a lauroyl sericinbased surfactant and its characteristics," RSC Adv., 4:4140-4145, (2014).
Yamada et al., "Preparation of undegraded native molecular fibroin solution from silkworm cocoons," Materials Science and Engineering C, 14:41-46, (2001).
Yazawa et al., "Influence of Water Content on the ?-Sheet Formation, Thermal Stability, Water Removal, and Mechanical Properties of Silk Materials," Biomacromolecules, 17(3):1057-1066, (2016).
Zheng et al., "Lithium-free processing of silk fibroin," Journal of Biomaterials Applications, 31(3):450-463, (2016).
Zong et al., "Effect of pH and Copper(II) on the Conformation Transitions of Silk Fibroin Based on EPR, NPR, and Raman Spectroscopy," Biochemistry, 43:11932-11941, (2004).

Control corn flakes     Silk-Coated corn flakes

FIG. 8

Control corn flakes     Silk-Coated corn flakes

FIG. 9

Control corn flakes                Silk-Coated corn flakes

FIG. 10

Control corn flakes                Silk-Coated corn flakes

FIG. 11

Control Corn Flakes​ ​ ​ Silk-Coated Corn Flakes

FIG. 12

Control Corn Flakes​ ​ ​ Silk-Coated Corn Flakes

FIG. 13

SYSTEMS AND METHODS FOR IMPROVING THE PERFORMANCE OF CEREAL USING A SILK FIBROIN SOLUTION AND POWDERS CONTAINING SILK FIBROIN

CROSS-REFERENCE TO RELATED APPLICATIONS

This application is a continuation of U.S. patent application Ser. No. 17/820,103, filed Aug. 16, 2022, which claims priority to and the benefit of U.S. Provisional Patent Application No. 63/233,513, filed Aug. 16, 2021; the disclosures of which are is hereby incorporated by reference in their entireties.

FIELD OF THE INVENTION

The disclosure relates to systems and methods for improving the performance of cereal using silk solutions and silk fibroin powders containing silk fibroin from silk inputs.

BACKGROUND

One third of the food produced in the world is wasted each year and over 45% of all fruits and vegetables are lost to spoilage. Food waste has massive economic, social, and environmental implications. According to the Natural Resources Defense Council (NRDC), a prominent non-profit international environmental advocacy group, the United States loses 40% of its food supply resulting in an estimated economic loss of $165 billion per year. Cereals also face food waste issues due to spoilage, which is combated, for example, through packaging and coatings. As but one example, cereals are frequently coated or made with high levels of sugar to achieve certain performance metrics desired by the consumer, including bowl life, crunchiness, crispiness, and appearance. While many alternatives to sugar exist to allow for a healthier experience for the eaters, sugar often provides functionality that is hard to replicate with a lower glycemic-index sweetener. Cereal is one example where a shift to lower calorie and lower glycemic index sweeteners have been an industry challenge. Embodiments of the present disclosure directly addresses the broader societal need for reducing food waste and increasing food availability by extending the shelf-life of cereals. Embodiments of the present disclosure represent significant commercial value by increasing revenue through reduced waste, improving the performance of cereals, and decreasing the sugar content in cereals.

SUMMARY OF THE INVENTION

The disclosure relates to products and methods for improving the performance of cereal manufactured with silk solutions and powder containing silk fibroin obtained from silk inputs, which can be used to improve the shelf life of cereals and to improve the performance of those cereals in areas valued by consumers.

In one embodiment, the disclosure provides for use of silk fibroin, where a silk source or silk input, such as silk cocoons (the silk cocoons can be whole, including the silkworm pupae, or be processed to remove the pupae and/or be cut in a specific manner), silk sheets, silk floss, or silk pellets, cut cocoons, shredded cocoons, silk yarns and threads, silk textiles, silk powder, silk grinds, silk wadding, silk protein, degummed silk, silk mats, silk webbing, silk fibers, or the like, is processed into a solution or a powder that includes silk fibroin. For example, a *Bombyx mori* silkworm is an example of a silk source that may be used in this process. This disclosure also applies to silk from silkworms other than the *Bombyx mori* (e.g., *Bombyx mandarina, Bombyx sinesis, Anaphe moloneyi, Anaphe panda, Anaphe reticulate, Anaphe ambrizia, Anaphe carteri, Anaphe venata, Anapha infracta, Antheraea assamensis, Antheraea assama, Antheraea mylitta, Antheraea pernyi, Antheraea yamamai, Antheraea polyphemus, Antheraea oculea, Anisota sanatoria, Apis mellifera, Araneus diadematus, Araneus cavaticus, Automeris io, Atticus atlas, Copaxa multifenestrata, Coscinocera hercules, Callosamia promethea, Eupackardia calleta, Eurprosthenops australis, Gonometa postica, Gonometa rufobrunnea, Hyalophora cecropia, Hyalophora euryalus, Hyalophora gloveri, Miranda auretia, Nephila madagascarensis, Nephila clavipes, Pachypasa otus, Pachypasa atus, Philosamia ricini, Pinna squamosa, Rothschildia hesperis, Rothschildia lebeau, Samia cynthia,* and *Samia ricini,* and *Tetragnatha versicolor*), as well as spiders, or other insects. This disclosure also applies to silk generated synthetically, transgenically, and other engineered silk (e.g., silks from bacteria, yeast, mammalian cells, transgenic animals, or transgenic plants). Silk proteins have a unique amino acid sequence repeatable via synthetic forms. This disclosure relates to such forms. For the avoidance of doubt, silk cocoons as described herein may be substituted for any of the above forms of silk, or similar forms of silk, be that natural or artificial. For example, if the disclosure states silk, silk inputs, silk cocoons, or silkworm cocoons are used, that means that any of the silk sources discussed in this paragraph (e.g., cocoons, floss, sheets, pellets, cut cocoons, shredded cocoons, silk yarns and threads, silk textiles, silk powder, silk grinds, silk wadding, silk protein, degummed silk, silk mats, silk webbing, silk fibers, generated silk sources (e.g., generated synthetically, by genetic recombination, transgenically, and other engineered silk), etc.) or a combination thereof may be used.

In one embodiment, the silk cocoons are subjected to a degumming step, a dissolution step, a purification step, a microfiltration step, and a powderization step, which results in a powder of the silk solution containing silk fibroin. In some embodiments, the silk fibroin may be isolated from the silk cocoons through the Ajisawa method or through other methods using water and salts, including chaotropic agents. In some embodiments, silk fibroin may be prepared according to the method described in Marelli, B., Brenckle, M., Kaplan, D. et al. Silk Fibroin as Edible Coating for Perishable Food Preservation. Sci Rep 6, 25263 (2016), https://doi.org/10.1038/srep25263, incorporated herein by reference in its entirety. The microfiltration step discussed herein would work with any acceptable method of isolating silk fibroin from silk cocoons, including instances where the silk fibroin is incorporated in a silk solution or as a powder. In some embodiments, the silk fibroin may be as described in US Patent Publication No. 2020-0178576 A1, incorporated herein by reference in its entirety. In some embodiments, the silk fibroin may be prepared as described in U.S. patent application Ser. No. 17/650,577, filed Feb. 10, 2022; Ser. No. 17/650,570, filed Feb. 10, 2022; and 63/191,441, filed May 21, 2021; the disclosures of which are hereby incorporated by reference herein in their entireties.

In some embodiments the silk fibroin present in an aqueous solution or powder may have a weight concentration (w/w) range from about 0.1% (w/w) to about 1% (w/w) from about 1% (w/w) to about 5% (w/w), from about 5%

(w/w) to about 10% (w/w), from 10% (w/w) to about 100% (w/w), from about 20% (w/w) to about 95% (w/w), from about 30% (w/w) to about 90% (w/w), from about 40% (w/w) to about 85% (w/w), from about 50% (w/w) to about 80% (w/w), from about 60% (w/w) to about 99% (w/w), from about 70% (w/w) to about 99% (w/w), from about 80% (w/w) to about 99% (w/w), from about 80% (w/w) to about 100% (w/w), from about 90% (w/w) to about 99% (w/w), or from about 80% (w/w) to about 90% (w/w). In an embodiment, the percent silk fibroin (w/w) present in an aqueous solution or powder is less than 60%. In an embodiment, the percent silk fibroin (w/w) present in an aqueous solution or powder is less than 25%. In an embodiment, the percent silk fibroin (w/w) present in an aqueous solution or powder is less than 20%. In an embodiment, the percent silk fibroin (w/w) present in an aqueous solution or powder is less than 19%. In an embodiment, the percent silk fibroin (w/w) present in an aqueous solution or powder is less than 18%. In an embodiment, the percent silk fibroin (w/w) present in an aqueous solution or powder is less than 17%. In an embodiment, the percent silk fibroin (w/w) present in an aqueous solution or powder is less than 16%. In an embodiment, the percent silk fibroin (w/w) present in an aqueous solution or powder is less than 15%. In an embodiment, the percent silk fibroin (w/w) present in an aqueous solution or powder is less than 14%. In an embodiment, the percent silk fibroin (w/w) present in an aqueous solution or powder is less than 13%. In an embodiment, the percent silk fibroin (w/w) present in an aqueous solution or powder is less than 12%. In an embodiment, the percent silk fibroin (w/w) present in an aqueous solution or powder is less than 11%. In an embodiment, the percent silk fibroin (w/w) present in an aqueous solution or powder is less than 10%. In an embodiment, the percent silk fibroin (w/w) present in an aqueous solution or powder is less than 9%. In an embodiment, the percent silk fibroin (w/w) present in an aqueous solution or powder is less than 8%. In an embodiment, the percent silk fibroin (w/w) present in an aqueous solution or powder is less than 7%. In an embodiment, the percent silk fibroin (w/w) present in an aqueous solution or powder is less than 6%. In an embodiment, the percent silk fibroin (w/w) present in an aqueous solution or powder is less than 5%. In an embodiment, the percent silk fibroin (w/w) present in an aqueous solution or powder is less than 4%. In an embodiment, the percent silk fibroin (w/w) present in an aqueous solution or powder is less than 3%. In an embodiment, the percent silk fibroin (w/w) present in an aqueous solution or powder is less than 2%. In an embodiment, the percent silk fibroin (w/w) present in an aqueous solution or powder is less than 1%. In an embodiment, the percent silk fibroin (w/w) present in an aqueous solution or powder is less than 0.9%. In an embodiment, the percent silk fibroin (w/w) present in an aqueous solution or powder is less than 0.8%. In an embodiment, the percent silk fibroin (w/w) present in an aqueous solution or powder is less than 0.7%. In an embodiment, the percent silk fibroin (w/w) present in an aqueous solution or powder is less than 0.6%. In an embodiment, the percent silk fibroin (w/w) present in an aqueous solution or powder is less than 0.5%. In an embodiment, the percent silk fibroin (w/w) present in an aqueous solution or powder is less than 0.4%. In an embodiment, the percent silk fibroin (w/w) present in an aqueous solution or powder is less than 0.3%. In an embodiment, the percent silk fibroin (w/w) present in an aqueous solution or powder is less than 0.2%. In an embodiment, the percent silk fibroin (w/w) present in an aqueous solution or powder is less than 0.1%. Higher or lower silk fibroin content may also be possible.

Figure 1:
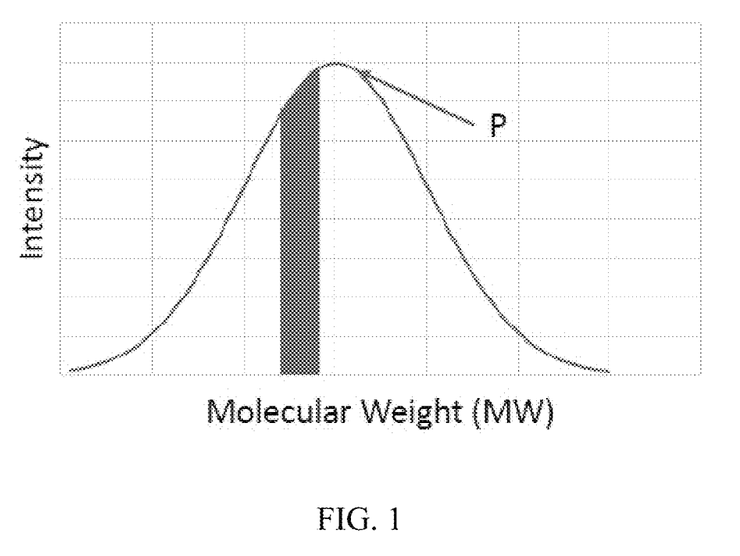
FIG. 1 shows an exemplary graph of the molecular weights (MW) of silk fibroin fragments in an exemplary silk film and/or coating.
Figure 2:
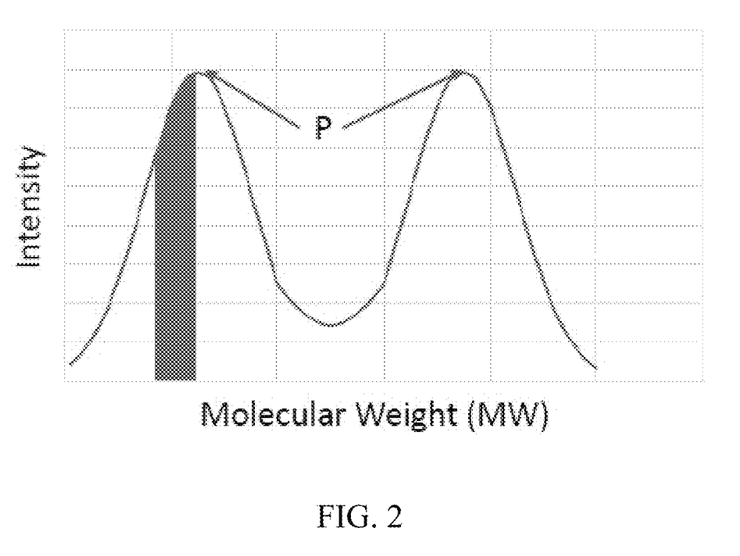
FIG. 2 shows an exemplary graph of the molecular weights (MW) of silk fibroin fragments in an exemplary silk film and/or coating.

In some embodiments, the silk fibroin comprises silk fibroin monomers, polymers, and/or fragments. As used herein, the term silk fibroin fragments also include assemblies of silk fibroin fragments. In some embodiments, the silk film and/or coating comprises a specific percentage (weight/volume) of silk fibroin fragments. In some embodiments, a specific percentage of the silk fibroin fragments have a specific molecular weight (MW). In this context, molecular weight (MW) refers to the molecular weight of individual silk fibroin fragments in a silk film and/or coating and is not to be confused with weight average molecular weight (Mw). To measure the various characteristics of the silk, one could use any industry appropriate method or device. In one example, gel permeation chromatography (GPC) could be used to acquire the molecular weight (MW) of silk fibroin fragments and the weight average molecular weight ($M_w$) of the silk. As an illustrative example, FIGS. 1 and 2 illustrate two different exemplary graphs of the molecular weights of silk fibroin fragments present in a silk film and/or coating. The X axis represents molecular weight (MW), and the Y axis represents intensity (e.g., the number of silk fibroin fragments with the same molecular weight). The blue bar illustrates a molecular weight (MW) range (e.g., 50 kDa to 100 kDa) that includes a certain percentage (e.g. 10%) of the fibroin fragments in the silk film and/or coating. The Figures also include peaks (P), for example FIG. 1 has one peak and FIG. 2 has two peaks. As a further example, a graph of the molecular weights (MW) of a silk film and/or coating could include more than two peaks. For the purposes of this disclosure, the number of peaks is not limiting and does not impact the percentages of silk fibroin fragments with a specific molecular weight (MW) as discussed herein.

In some aspects, none of the silk fibroin fragments have a molecular weight (MW) under 100 kilodaltons (kDa), less than 1% of the silk fibroin fragments have a molecular weight (MW) under 100 kDa, more than about 1% of the silk fibroin fragments have a molecular weight (MW) under 100 kDa, more than about 5% of the silk fibroin fragments have a molecular weight (MW) under 100 kDa, more than about 10% of the silk fibroin fragments have a molecular weight (MW) under 100 kDa, more than about 15% of the silk fibroin fragments have a molecular weight (MW) under 100 kDa, more than about 20% of the silk fibroin fragments have a molecular weight (MW) under 100 kDa, more than about 25% of the silk fibroin fragments have a molecular weight (MW) under 100 kDa, more than about 30% of the silk fibroin fragments have a molecular weight (MW) under 100 kDa, more than about 35% of the silk fibroin fragments have a molecular weight (MW) under 100 kDa, more than about 40% of the silk fibroin fragments have a molecular weight (MW) under 100 kDa, more than about 45% of the silk fibroin fragments have a molecular weight (MW) under 100 kDa, more than about 50% of the silk fibroin fragments have a molecular weight (MW) under 100 kDa, more than about 55% of the silk fibroin fragments have a molecular weight (MW) under 100 kDa, more than about 60% of the silk fibroin fragments have a molecular weight (MW) under 100 kDa, more than about 65% of the silk fibroin fragments have a molecular weight (MW) under 100 kDa, more than about 70% of the silk fibroin fragments have a molecular weight (MW) under 100 kDa, more than about 75% of the silk fibroin fragments have a molecular weight (MW) under 100 kDa, more than about 80% of the silk fibroin fragments have a molecular weight (MW) under 100 kDa, more than about 85% of the silk fibroin fragments have a molecular weight (MW) under 100 kDa, more than about 90% of the silk fibroin fragments have a molecular weight (MW) under 100 kDa, more than about 95% of the silk fibroin fragments have a molecular weight (MW) under 100 kDa.

In some aspects, none of the silk fibroin fragments have a molecular weight (MW) above 100 kDa, less than 1% of the silk fibroin fragments have a molecular weight (MW) above 100 kDa, more than about 1% of the silk fibroin fragments have a molecular weight (MW) above 100 kDa, more than about 5% of the silk fibroin fragments have a molecular weight (MW) above 100 kDa, more than about 10% of the silk fibroin fragments have a molecular weight (MW) above 100 kDa, more than about 15% of the silk fibroin fragments have a molecular weight (MW) above 100 kDa, more than about 20% of the silk fibroin fragments have a molecular weight (MW) above 100 kDa, more than about 25% of the silk fibroin fragments have a molecular weight (MW) above 100 kDa, more than about 30% of the silk fibroin fragments have a molecular weight (MW) above 100 kDa, more than about 35% of the silk fibroin fragments have a molecular weight (MW) above 100 kDa, more than about 40% of the silk fibroin fragments have a molecular weight (MW) above 100 kDa, more than about 45% of the silk fibroin fragments have a molecular weight (MW) above 100 kDa, more than about 50% of the silk fibroin fragments have a molecular weight (MW) above 100 kDa, more than about 55% of the silk fibroin fragments have a molecular weight (MW) above 100 kDa, more than about 60% of the silk fibroin fragments have a molecular weight (MW) above 100 kDa, more than about 65% of the silk fibroin fragments have a molecular weight (MW) above 100 kDa, more than about 70% of the silk fibroin fragments have a molecular weight (MW) above 100 kDa, more than about 75% of the silk fibroin fragments have a molecular weight (MW) above 100 kDa, more than about 80% of the silk fibroin fragments have a molecular weight (MW) above 100 kDa, more than about 85% of the silk fibroin fragments have a molecular weight (MW) above 100 kDa, more than about 90% of the silk fibroin fragments have a molecular weight (MW) above 100 kDa, more than about 95% of the silk fibroin fragments have a molecular weight (MW) above 100 kDa.

In some aspects, none of the silk fibroin fragments have a molecular weight (MW) above 200 kDa, less than 1% of the silk fibroin fragments have a molecular weight (MW) above 200 kDa, more than about 1% of the silk fibroin fragments have a molecular weight (MW) above 200 kDa, more than about 5% of the silk fibroin fragments have a molecular weight (MW) above 200 kDa, more than about 10% of the silk fibroin fragments have a molecular weight (MW) above 200 kDa, more than about 15% of the silk fibroin fragments have a molecular weight (MW) above 200 kDa, more than about 20% of the silk fibroin fragments have a molecular weight (MW) above 200 kDa, more than about 25% of the silk fibroin fragments have a molecular weight (MW) above 200 kDa, more than about 30% of the silk fibroin fragments have a molecular weight (MW) above 200 kDa, more than about 35% of the silk fibroin fragments have a molecular weight (MW) above 200 kDa, more than about 40% of the silk fibroin fragments have a molecular weight (MW) above 200 kDa, more than about 45% of the silk fibroin fragments have a molecular weight (MW) above 200 kDa, more than about 50% of the silk fibroin fragments have a molecular weight (MW) above 200 kDa, more than about 55% of the silk fibroin fragments have a molecular weight (MW) above 200 kDa, more than about 60% of the silk fibroin fragments have a molecular weight (MW) above 200 kDa, more than about 65% of the silk fibroin fragments have a molecular weight (MW) above 200 kDa, more than about 70% of the silk fibroin fragments have a molecular weight (MW) above 200 kDa, more than about 75% of the silk fibroin fragments have a molecular weight (MW) above 200 kDa, more than about 80% of the silk fibroin fragments have a molecular weight (MW) above 200 kDa, more than about 85% of the silk fibroin fragments have a molecular weight (MW) above 200 kDa, more than about 90% of the silk fibroin fragments have a molecular weight (MW) above 200 kDa, more than about 95% of the silk fibroin fragments have a molecular weight (MW) above 200 kDa.

In some aspects, none of the silk fibroin fragments have a molecular weight (MW) above 300 kDa, less than 1% of the silk fibroin fragments have a molecular weight (MW) above 300 kDa, more than about 1% of the silk fibroin fragments have a molecular weight (MW) above 300 kDa, more than about 5% of the silk fibroin fragments have a molecular weight (MW) above 300 kDa, more than about 10% of the silk fibroin fragments have a molecular weight (MW) above 300 kDa, more than about 15% of the silk fibroin fragments have a molecular weight (MW) above 300 kDa, more than about 20% of the silk fibroin fragments have a molecular weight (MW) above 300 kDa, more than about 25% of the silk fibroin fragments have a molecular weight (MW) above 300 kDa, more than about 30% of the silk fibroin fragments have a molecular weight (MW) above 300 kDa, more than about 35% of the silk fibroin fragments have a molecular weight (MW) above 300 kDa, more than about 40% of the silk fibroin fragments have a molecular weight (MW) above 300 kDa, more than about 45% of the silk fibroin fragments have a molecular weight (MW) above 300 kDa, more than about 50% of the silk fibroin fragments have a molecular weight (MW) above 300 kDa, more than about 55% of the silk fibroin fragments have a molecular weight (MW) above 300 kDa, more than about 60% of the silk fibroin fragments have a molecular weight (MW) above 300 kDa, more than about 65% of the silk fibroin fragments have a molecular weight (MW) above 300 kDa, more than about 70% of the silk fibroin fragments have a molecular weight (MW) above 300 kDa, more than about 75% of the silk fibroin fragments have a molecular weight (MW) above 300 kDa, more than about 80% of the silk fibroin fragments have a molecular weight (MW) above 300 kDa, more than about 85% of the silk fibroin fragments have a molecular weight (MW) above 300 kDa, more than about 90% of the silk fibroin fragments have a molecular weight (MW) above 300 kDa, more than about 95% of the silk fibroin fragments have a molecular weight (MW) above 300 kDa.

In some aspects, none of the silk fibroin fragments have a molecular weight (MW) above 400 kDa, less than 1% of the silk fibroin fragments have a molecular weight (MW) above 400 kDa, more than about 1% of the silk fibroin fragments have a molecular weight (MW) above 400 kDa, more than about 5% of the silk fibroin fragments have a molecular weight (MW) above 400 kDa, more than about 10% of the silk fibroin fragments have a molecular weight (MW) above 400 kDa, more than about 15% of the silk fibroin fragments have a molecular weight (MW) above 400 kDa, more than about 20% of the silk fibroin fragments have a molecular weight (MW) above 400 kDa, more than about 25% of the silk fibroin fragments have a molecular weight (MW) above 400 kDa, more than about 30% of the silk fibroin fragments have a molecular weight (MW) above 400 kDa, more than about 35% of the silk fibroin fragments have a molecular weight (MW) above 400 kDa, more than about 40% of the silk fibroin fragments have a molecular weight (MW) above 400 kDa, more than about 45% of the silk fibroin fragments have a molecular weight (MW) above 400 kDa, more than about 50% of the silk fibroin fragments have a molecular weight (MW) above 400 kDa, more than about 55% of the silk fibroin fragments have a molecular weight (MW) above 400 kDa, more than about 60% of the silk fibroin fragments have a molecular weight (MW) above 400 kDa, more than about 65% of the silk fibroin fragments have a molecular weight (MW) above 400 kDa, more than about 70% of the silk fibroin fragments have a molecular weight (MW) above 400 kDa, more than about 75% of the silk fibroin fragments have a molecular weight (MW) above 400 kDa, more than about 80% of the silk fibroin fragments have a molecular weight (MW) above 400 kDa, more than about 85% of the silk fibroin fragments have a molecular weight (MW) above 400 kDa, more than about 90% of the silk fibroin fragments have a molecular weight (MW) above 400 kDa, more than about 95% of the silk fibroin fragments have a molecular weight (MW) above 400 kDa.

In some aspects, between about 1% and about 30% of the silk fibroin fragments have a molecular weight (MW) under 100 kDa, between about 10% and about 30% of the silk fibroin fragments have a molecular weight (MW) under 100 kDa, between about 10% and about 50% of the silk fibroin fragments have a molecular weight (MW) under 100 kDa, between about 10% and about 75% of the silk fibroin fragments have a molecular weight (MW) under 100 kDa, between about 10% and about 95% of the silk fibroin fragments have a molecular weight (MW) under 100 kDa, between about 15% and about 30% of the silk fibroin fragments have a molecular weight (MW) under 100 kDa, between about 15% and about 40% of the silk fibroin fragments have a molecular weight (MW) under 100 kDa, between about 20% and about 30% of the silk fibroin fragments have a molecular weight (MW) under 100 kDa, between about 20% and about 35% of the silk fibroin fragments have a molecular weight (MW) under 100 kDa, between about 30% and about 50% of the silk fibroin fragments have a molecular weight (MW) under 100 kDa, between about 50% and about 90% of the silk fibroin fragments have a molecular weight (MW) under 100 kDa, between about 50% and about 75% of the silk fibroin fragments have a molecular weight (MW) under 100 kDa, between about 60% and about 75% of the silk fibroin fragments have a molecular weight (MW) under 100 kDa, between about 75% and about 95% of the silk fibroin fragments have a molecular weight (MW) under 100 kDa, between about 80% and about 95% of the silk fibroin fragments have a molecular weight (MW) under 100 kDa.

In some aspects, between about 1% and about 90% of the silk fibroin fragments have a molecular weight (MW) above 100 kDa, between about 30% and about 90% of the silk fibroin fragments have a molecular weight (MW) above 100 kDa, between about 40% and about 90% of the silk fibroin fragments have a molecular weight (MW) above 100 kDa, between about 50% and about 90% of the silk fibroin fragments have a molecular weight (MW) above 100 kDa, between about 60% and about 90% of the silk fibroin fragments have a molecular weight (MW) above 100 kDa, between about 50% and about 85% of the silk fibroin fragments have a molecular weight (MW) above 100 kDa, between about 60% and about 85% of the silk fibroin fragments have a molecular weight (MW) above 100 kDa, between about 55% and about 80% of the silk fibroin fragments have a molecular weight (MW) above 100 kDa, between about 65% and about 85% of the silk fibroin fragments have a molecular weight (MW) above 100 kDa, between about 60% and about 80% of the silk fibroin fragments have a molecular weight (MW) above 100 kDa, between about 70% and about 80% of the silk fibroin fragments have a molecular weight (MW) above 100 kDa.

In some aspects, between about 0.1% and about 40% of the silk fibroin fragments have a molecular weight (MW) above 200 kDa, between about 0.1% and about 30% of the silk fibroin fragments have a molecular weight (MW) above 200 kDa, between about 0.1% and about 20% of the silk fibroin fragments have a molecular weight (MW) above 200 kDa, between about 0.1% and about 10% of the silk fibroin fragments have a molecular weight (MW) above 200 kDa, between about 0.5% and about 40% of the silk fibroin fragments have a molecular weight (MW) above 200 kDa, between about 0.5% and about 30% of the silk fibroin fragments have a molecular weight (MW) above 200 kDa, between about 0.5% and about 20% of the silk fibroin fragments have a molecular weight (MW) above 200 kDa, between about 0.5% and about 10% of the silk fibroin fragments have a molecular weight (MW) above 200 kDa, between about 1% and about 30% of the silk fibroin fragments have a molecular weight (MW) above 200 kDa, between about 1% and about 20% of the silk fibroin fragments have a molecular weight (MW) above 200 kDa, between about 1% and about 10% of the silk fibroin fragments have a molecular weight (MW) above 200 kDa.

In some aspects, between about 1% and about 30% of the silk fibroin fragments have a molecular weight (MW) above 300 kDa, between about 10% and about 30% of the silk fibroin fragments have a molecular weight (MW) above 300 kDa, between about 10% and about 50% of the silk fibroin fragments have a molecular weight (MW) above 300 kDa, between about 10% and about 75% of the silk fibroin fragments have a molecular weight (MW) above 300 kDa, between about 10% and about 95% of the silk fibroin fragments have a molecular weight (MW) above 300 kDa, between about 15% and about 30% of the silk fibroin fragments have a molecular weight (MW) above 300 kDa, between about 30% and about 50% of the silk fibroin fragments have a molecular weight (MW) above 300 kDa, between about 50% and about 90% of the silk fibroin fragments have a molecular weight (MW) above 300 kDa, between about 50% and about 75% of the silk fibroin fragments have a molecular weight (MW) above 300 kDa, between about 60% and about 75% of the silk fibroin fragments have a molecular weight (MW) above 300 kDa, between about 75% and about 95% of the silk fibroin fragments have a molecular weight (MW) above 300 kDa, between about 80% and about 95% of the silk fibroin fragments have a molecular weight (MW) above 300 kDa.

In some aspects, between about 1% and about 60% of the silk fibroin fragments have a molecular weight (MW) above 400 kDa, between about 1% and about 20% of the silk fibroin fragments have a molecular weight (MW) above 400 kDa, between about 1% and about 30% of the silk fibroin fragments have a molecular weight (MW) above 400 kDa, between about 5% and about 20% of the silk fibroin fragments have a molecular weight (MW) above 400 kDa, between about 30% and about 60% of the silk fibroin fragments have a molecular weight (MW) above 400 kDa, between about 35% and about 55% of the silk fibroin fragments have a molecular weight (MW) above 400 kDa, between about 35% and about 75% of the silk fibroin fragments have a molecular weight (MW) above 400 kDa, between about 35% and about 85% of the silk fibroin fragments have a molecular weight (MW) above 400 kDa, between about 50% and about 85% of the silk fibroin fragments have a molecular weight (MW) above 400 kDa, between about 55% and about 80% of the silk fibroin fragments have a molecular weight (MW) above 400 kDa, between about 70% and about 90% of the silk fibroin fragments have a molecular weight (MW) above 400 kDa.

In one aspect, the disclosure relates to improving the performance and shelf life of cereals coated with silk fibroin to form a silk coating. This silk coating could cover the entire piece of cereal, a portion of the piece of cereal (e.g., the top or bottom), a component of the cereal (e.g., a fruit or nut), cover just the flavored coating, cover everything but the flavored coating, or be incorporated into the flavored coating.

In one aspect, the disclosure relates to improving the performance and shelf life of cereals incorporating silk fibroin.

In some aspects, the disclosure relates to improving the performance of cereals by reducing the glycemic index of the cereal by at least 30%. In other aspects, the disclosure relates to improving the performance of cereals by reducing the glycemic index of the cereal by at least 30%, 35%, 40%, 45%, 50%, 55%, 60%, 65%, 70%, or 75%. For example, a silk coating on the cereal would create a barrier and could permit a reduction of a monosaccharide, disaccharide, oligosaccharide, a polysaccharide, or a combination thereof present in a coating of the cereal (e.g., sweetener, flavoring, etc.). This in turn could improve the nutritional aspects of the cereal, without sacrificing the quality of the cereal. The table below is an example of some common sweetener ingredients utilized in the food industry and their associated glycemic index value.

TABLE 1

| Ingredient | Glycemic Index |
| --- | --- |
| Maltodextrin | 110 |
| Glucose | 100 |
| Sucrose | 65 |
| Honey | 50 |
| Brown Rice Syrup | 25 |
| Xylitol | 12 |
| Stevia | <1 |

Currently, sweeteners like sucrose, which has a high glycemic index, are utilized. Substituting sweeteners with a lower glycemic index, such as xylitol or stevia, can be difficult because they cannot match the functionality of the higher glycemic index sweeteners. Silk coatings offer an opportunity to match the functionality of the higher glycemic index sweeteners and may permit increased options for substitution.

In one aspect, the disclosure relates to a method of enhancing the performance of a cereal product by utilizing silk fibroin. The method includes the steps of (A) obtaining a raw ingredient, where the raw ingredient is one or more of wheat, rice, maize, oat, barley, rye, millet, and sorghum; (B) cooking the raw ingredient with a liquid and a flavoring to create a softened ingredient; (C) drying the softened ingredient to a first moisture level; (D) processing the softened ingredient to create the cereal product; (E) drying the cereal product to a second moisture level; and (F) producing a coating liquid that includes a sweetener, wherein the coating liquid has a reduced glycemic index of at least 30% relative to a standard glycemic index for a conventional coating liquid. Generally, a conventional coating liquid is a coating liquid having a typical recipe for a particular type of cereal product and will vary to suit a particular application. For example, the coating liquid recipe for a regular corn flake vs a frosted flake vs. rolled oats vs. fruit rings, etc. will vary (e.g., different amounts of sweeteners/flavorings, solvents, etc.). The method further comprises the steps of (G) mixing a silk fibroin-based input with the coating liquid to create a silk fibroin coating liquid, wherein the silk input was derived from a cocoon created by a *Bombyx mori* silkworm; (H) coating the cereal product in a drum with the silk fibroin coating liquid to create a coated cereal product, wherein the coated cereal product has a firmness measurement after submersion in a cool liquid for sixty seconds that is at least the same as or greater than a firmness measurement of a cereal product with the conventional coating submersed in the cool liquid for sixty seconds; (I) drying the coated cereal product to cure the silk fibroin coating liquid; and (J) distributing the flaked cereal into packaging for sale.

In another aspect, the disclosure relates to a method of enhancing the performance of a flaked cereal and reducing the glycemic index of flaked cereal by utilizing silk fibroin. The method includes the steps of (A) obtaining a raw ingredient, where the raw ingredient is corn, wheat, or rice; (B) cooking the raw ingredient with a liquid and a flavoring to create a softened ingredient; (C) drying the softened ingredient to a first moisture level; D) processing the softened ingredient through a mill to create a flaked cereal; (E) drying the flaked cereal to a second moisture level; (F) cooling the flaked cereal; (G) obtaining a coating liquid that includes a sweetener, wherein the coating liquid has a first glycemic index; (H) reducing the glycemic index of the coating liquid to a second glycemic index, wherein the second glycemic index is at least 30% less than the first glycemic index; (I) mixing a silk fibroin-based input with the coating liquid to create a silk fibroin coating liquid, wherein the silk input was derived from a cocoon created by a *Bombyx mori* silkworm; (J) coating the flaked cereal in a drum with the silk fibroin coating liquid to create a coated flaked cereal; (K) drying the coated flaked cereal to cure the silk fibroin coating liquid; and (L) distributing the flaked cereal into packaging for sale. In some embodiments, the second glycemic index coated flaked cereal has a second firmness measurement that is equal to or greater than the first glycemic coated flaked cereal having a first firmness measurement.

Generally, the glycemic index of the coating liquid is reduced relative to a "standard" glycemic index of a conventional coating liquid. The "standard" glycemic index for a particular coating liquid will vary for a particular recipe, and by extension, for the desired, resultant cereal product (e.g., a highly sweetened "kid's" cereal vs one intended for an adult). The glycemic index of the coating liquid may be reduced at the production stage by, for example, reducing the amount of sweetener introduced into a solvent to produce the coating liquid (e.g., reducing the amount of sweetener called for by the recipe by 30%, substituting the sweetener for a different sweetener with a lower glycemic index, etc.). Alternatively, or additionally, the glycemic index of the coating liquid may be reduced by introducing of an additional component to the coating liquid (either during production or after production of the coating liquid), such as, for example, fiber, an acid (e.g., vinegar, lemon juice, etc.), or similar component. Additionally, introduction of the silk fibroin-based input with the coating liquid may further reduce the overall glycemic index by, in part, diluting the coating liquid.

In yet another aspect, the disclosure relates to a method of enhancing the performance of a cereal product and reducing the glycemic index of the cereal product by utilizing silk fibroin. The method includes the steps of (A) obtaining a raw ingredient, where the raw ingredient is grain-based; (B) cooking the raw ingredient with a liquid and a flavoring to create a softened ingredient; (C) drying the softened ingredient to a first moisture level; (D) processing the softened ingredient to create the cereal product; (E) drying the cereal product to a second moisture level; (F) cooling the cereal product; (G) obtaining a coating liquid that includes a sweetener, wherein the coating liquid has a first glycemic index; (H) reducing the glycemic index of the coating liquid to a second glycemic index, wherein the second glycemic index is at least 30% less than the first glycemic index; (I) mixing a silk fibroin input with a coating liquid to create a silk fibroin coating liquid, wherein the silk input was derived from a cocoon created by a *Bombyx mori* silkworm; (J) coating the cereal product in a drum with the silk fibroin coating liquid to create a coated cereal; (K) drying the coated cereal product to cure the silk fibroin coating liquid; and (L) distributing the cereal product into packaging for sale.

In still another aspect, the disclosure relates to a method of enhancing the performance of a cereal product and reducing the glycemic index of the cereal product by utilizing silk fibroin. The method includes the steps of (A) obtaining a raw ingredient, where the raw ingredient is grain-based; (B) providing a silk fibroin-based product, wherein the silk fibroin-based product was derived from a cocoon created by a *Bombyx mori* silkworm; (C) obtaining a flavoring that has a first glycemic index; (D) reducing the glycemic index of the flavoring to a second glycemic index, wherein the second glycemic index is at least 30% less than the first glycemic index; (E) cooking the raw ingredient with a liquid, the flavoring, and the silk fibroin-based product to create a softened ingredient; (D) drying the softened ingredient to a first moisture level; (E) processing the softened ingredient to create the cereal product; (F) drying the cereal product to a second moisture level; and (G) distributing the cereal product into packaging for sale.

In various embodiments of the foregoing aspects, the first moisture level may be between about 15% and about 50% and the second moisture level may be between about 1% and about 5%. The sweetener/flavoring may include a monosaccharide, a disaccharide, an oligosaccharide, a polysaccharide, or combinations thereof. Additionally, the grain-based ingredient may include one or more of wheat, rice, maize, oat, barley, rye, millet, and sorghum. The silk fibroin-based product may be provided as a powder. In additional embodiments, after exposing the coated flakes (or other cereal product) to the cool liquid, a translucency of the coated flaked cereals is less than a translucency of flaked cereals. Moreover, after exposure to the cool liquid, the flaked cereals sink in the cool liquid at a faster rate than the coated flaked cereals.

In additional embodiments, the processing step may include rolling the softened ingredient through a mill to create the cereal product, extruding the softened ingredient through a die to create the cereal product (e.g., by extruding the softened ingredient into a defined shape, such as spherical, loop, elongate, cylindrical, numeric, and alphabetic), expanding the softened ingredient through a gun to create the cereal product, and/or processing the softened ingredient through a shredder to create the cereal product. In some embodiments, the cereal product may include a flaked cereal product, a puffed cereal product, a shredded cereal product, or combinations thereof.

Still other aspects, embodiments, and advantages of these exemplary aspects and embodiments, are discussed in detail below and in the attached slides. Moreover, it is to be understood that both the foregoing information and the following detailed description are merely illustrative examples of various aspects and embodiments and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The file of this patent or application contains at least one drawing/photograph executed in color. Copies of this patent with color drawing(s)/photograph(s) will be provided by the Office upon request and payment of the necessary fee.

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

Unless specified otherwise or clear from context, references to first, second, third or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships, or the like, unless otherwise stated, any one or more if not all of these may be absolute or approximate to account for acceptable variations that may occur, such as those due to engineering tolerances or the like.

The disclosure relates to systems and methods for improving the performance of cereal using silk solutions and silk fibroin powders containing silk fibroin from silk cocoons.

In order for the present disclosure to be more readily understood, certain terms are first defined below. Additional definitions for the following terms and other terms are set forth throughout the Specification.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The term "and/or" where used herein is to be taken as specific disclosure of each of the two specified features or components with or without the other. Thus, the term "and/or" as used in a phrase such as "A and/or B" herein is intended to include A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

The terms "e.g.," and "i.e.," as used herein, are used merely by way of example, without limitation intended, and should not be construed as referring only those items explicitly enumerated in the specification.

The terms "or more", "at least", "more than", and the like, e.g., "at least one" are understood to include but not be limited to at least 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between.

Conversely, the term "no more than" includes each value less than the stated value. In one embodiment, "no more than 100" includes 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0. Also included is any lesser number or fraction in between.

The terms "plurality", "at least two", "two or more", "at least second", and the like, are understood to include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers, or steps. It is understood that wherever embodiments are described herein with the language "comprising," otherwise analogous embodiments described in terms of "consisting of" and/or "consisting essentially of" are also provided. The term "consisting of" excludes any element, step, or ingredient not specified in the claim. In one embodiment, "consisting of" is defined as "closing the claim to the inclusion of materials other than those recited except for impurities ordinarily associated therewith. A claim which depends on a claim which "consists of" the recited elements or steps cannot add an element or step. The terms "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless specifically stated or evident from context, as used herein, the term "about" refers to a value or composition that is within an acceptable error range for the particular value or composition as determined by one of ordinary skill in the art, which will depend in part on how the value or composition is measured or determined, i.e., the limitations of the measurement system. In one embodiment, "about" or "approximately" may mean within one or more than one standard deviation per the practice in the art. "About" or "approximately" may mean a range of up to 10% (i.e., ±10%). Thus, "about" may be understood to be within 10%, 9%, 8%, 7%, 6%, 5%, 4%, 3%, 2%, 1%, 0.5%, 0.1%, 0.05%, 0.01%, or 0.001% greater or less than the stated value. In one embodiment, about 5 mg may include any amount between 4.5 mg and 5.5 mg. Furthermore, particularly with respect to biological systems or processes, the terms may mean up to an order of magnitude or up to 5-fold of a value. When particular values or compositions are provided in the instant disclosure, unless otherwise stated, the meaning of "about" or "approximately" should be assumed to be within an acceptable error range for that particular value or composition.

Further, as used in the following, the terms "preferably", "more preferably", "most preferably", "particularly", "more particularly", "specifically", "more specifically" or similar terms are used in conjunction with optional features, without restricting further possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding further embodiments of the disclosure, without any restrictions regarding the scope of the disclosure, and without any restriction regarding the possibility of combining the features introduced in such way with other optional or non-optional features of the disclosure.

As described herein, any concentration range, percentage range, ratio range or integer range is to be understood to be inclusive of the value of any integer within the recited range and, when appropriate, fractions thereof (such as one-tenth and one-hundredth of an integer), unless otherwise indicated.

Units, prefixes, and symbols used herein are provided using their Systéme International de Unites (SI) accepted form. Numerical ranges are inclusive of the numbers defining the range. Additionally, where multiples of the same components are described, the multiples may be referred to individually (e.g., ##a, ##b, ##c, etc.) or collectively (##).

DESCRIPTION

FIGS. 3-15 depict a set of experiments that were run using (1) store-brand uncoated corn flake cereal (control) and (2) the same store-brand corn flake cereal silk coated in accordance with one or more embodiments of the disclosure to determine the performance improvement resulting from silk coating cereal. To start, the corn flakes were divided into two equal groups. The first group was marked as the control group and the only processing it underwent was a baking step to mimic processing steps from the treated group as well as from traditional manufacturing of corn flakes. The silk coated group was coated with a solution of silk fibroin and water. Immediately after coating, the silk coated group was baked in an oven to evaporate the water in the solution, leaving behind a silk coating on the corn flakes. This baking step may occur prior to coating the corn flakes, such that the silk solution is applied to heated or hot flakes. This experiment is only one of many methods to add a silk coating to cereal, as discussed more fully below.

The groups then underwent a series of tests to measure the benefit of the silk coating on the corn flakes.

Figure 3:
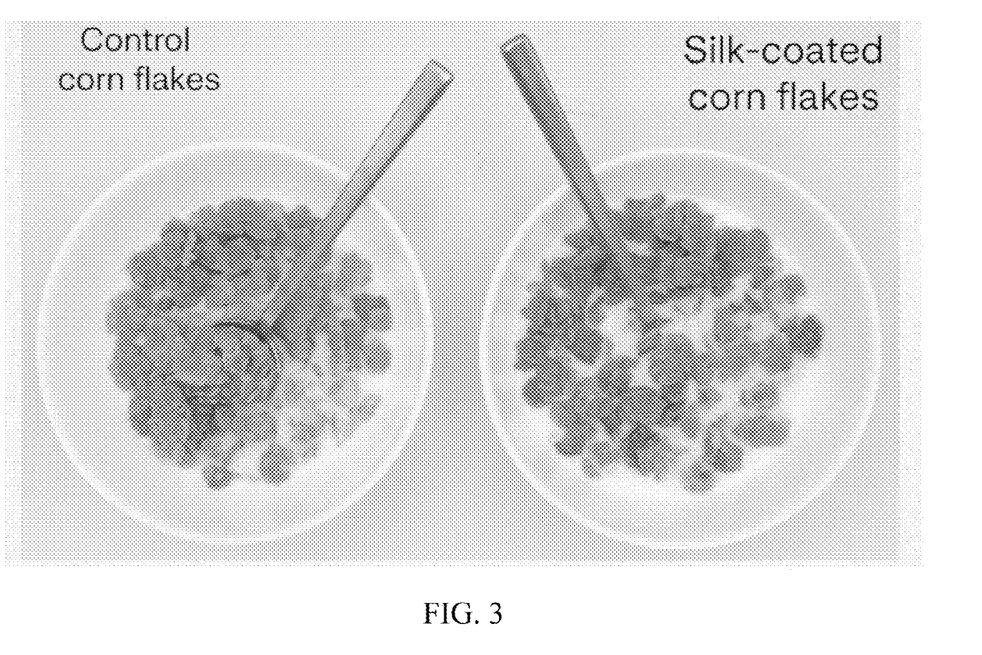
FIG. 3 is a pictorial representation of a bowl of untreated cornflakes (control) and a bowl of silk-coated cornflakes in accordance with one or more embodiments of the disclosure.
Figure 4:
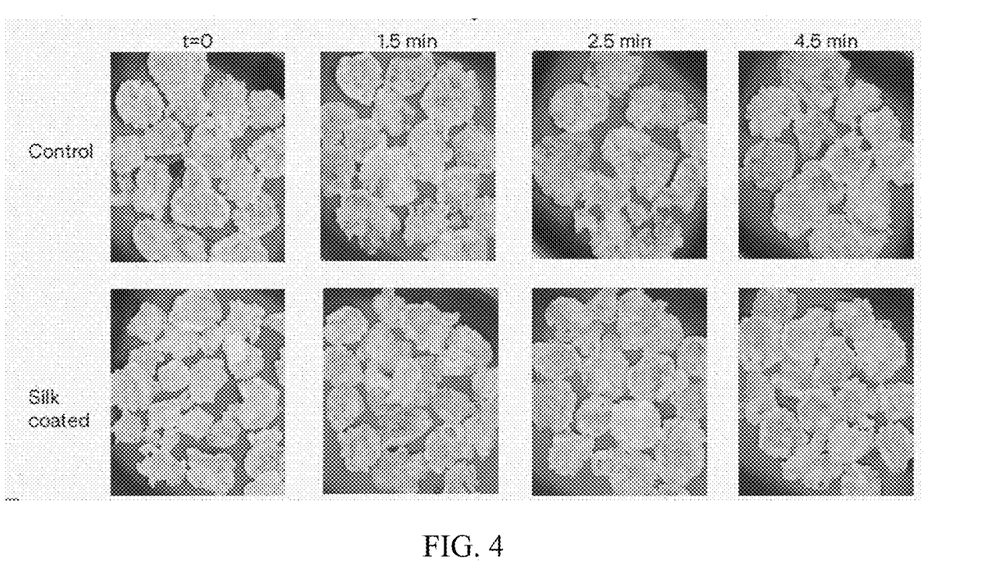
FIG. 4 is a series of pictorial representations of the control corn flakes compared to the silk coated corn flakes of FIG. 3 depicting the translucency of the flakes at various elapsed times.

Translucency Test: The first test was designed to measure aspects of bowl life of the cereal by measuring the translucency of the corn flakes. This experiment is shown in FIGS. 3 and 4. In this experiment, the corn flakes from both the control group and the silk coated group were submerged in water for a specified amount of time before the water was drained. Specifically, 20 grams of cereal were submerged in 200 milliliters of water for one and half minutes, two and a half minutes, and four and a half minutes. Then the groups were compared at the various time intervals to determine the impact of the silk coating.

As seen in FIG. 4, the silk coated cereal had fewer translucent flakes, with the average flake gaining less translucency. This experiment exhibits one of the benefits of a silk coating, which is that it acts as a barrier and limits the transmission of liquid, in this case water, to the corn flake. The same is true of other liquids, including liquids containing lipids, such as milk. The silk coating is hydrophobic, which prevents liquid from passing through the barrier and impacting the cereal.

Figure 5:
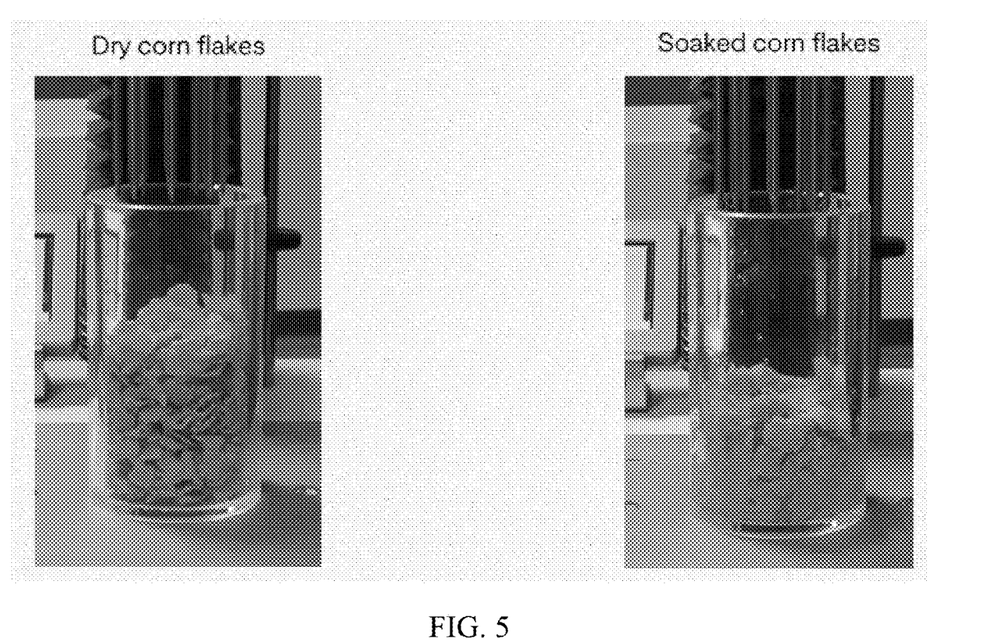
FIG. 5 is a pictorial representation of dry corn flakes and soaked corn flakes prior to mechanical testing to compare the aggregate firmness of uncoated and silk-coated flakes.
Figure 6:
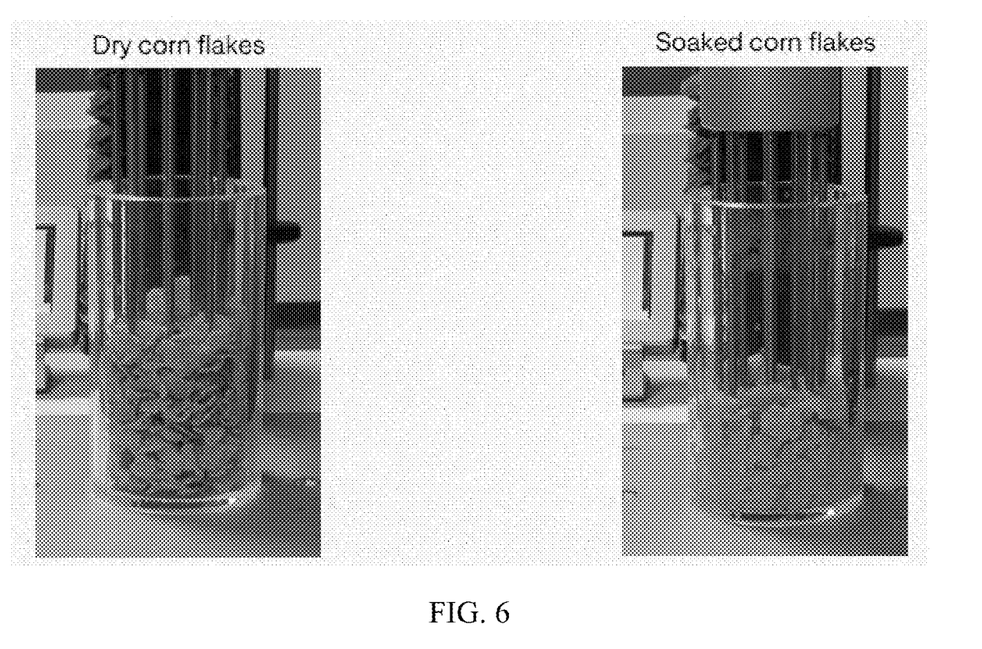
FIG. 6 is a pictorial representation of the dry corn flakes and the soaked corn flakes of FIG. 5 during mechanical testing to compare the aggregate firmness of the uncoated and silk-coated flakes.
Figure 7:
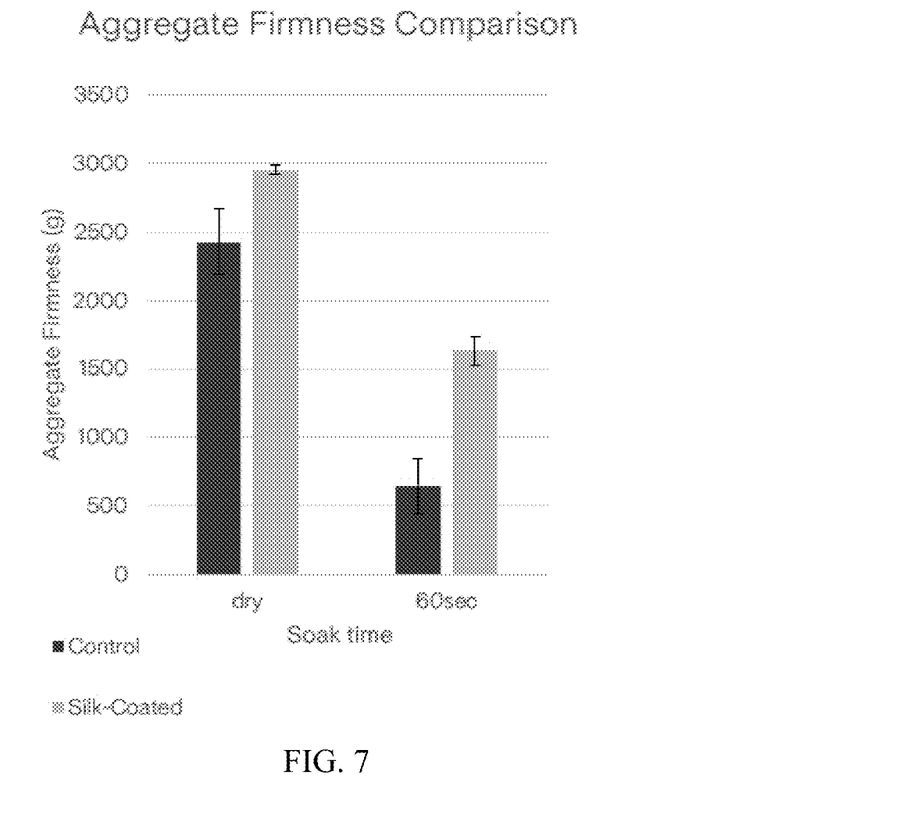
FIG. 7 is a graphical representation of the aggregate firmness of uncoated (control) corn flakes versus the silk-coated corn flakes at different elapsed soaking times.

Texture Analysis: The second test was designed to measure the texture of the corn flake cereal after being soaked in liquid. FIGS. 5-7 illustrate this experiment and its results. A multiple puncture probe was used in this test because it can test non-uniform products, such as corn flakes that are different size, shape, structure, and hardness, while still obtaining repeatable results. The control group and the silk coated group were placed in water for different periods of time, including: dry (0 seconds) and 60 seconds. Then the groups were removed from the water and tested using the multiple puncture probe, which was inserted 20 millimeters into the mass of corn flakes. FIGS. 5 and 6 show the probes prior to contacting and after contacting the corn flakes. FIG. 7 shows the results of this test, with the silk coated group performing better than the control group across aggregate firmness. In particular, the silk coated group had an aggregate firmness almost triple the control group at 60 seconds, showing the impact the silk coating has on water absorption. In this respect, a silk coating can improve the aggregate firmness of coated cereal exposed to a cool liquid, e.g., liquid stored at temperatures found in a refrigerator (35-40 degrees Fahrenheit) up to room temperature (75 degrees Fahrenheit), by at least 50%, 75%, 100%, 150%, 200%, 250%, 300% compared to uncoated cereal. In another respect, the aggregate firmness of cereal with a reduced glycemic index can meet or exceed the aggregate firmness cereal with a higher glycemic index. This result indicates that the silk coated corn flakes retain crunchiness and crispness compared to the control group after exposure to liquid. This is particularly beneficial for cereal, as most consumers place cereal in a liquid, like milk. Preserving the firmness of the cereal while in liquid prolongs the same sensation as dry cereal.

Figure 8:
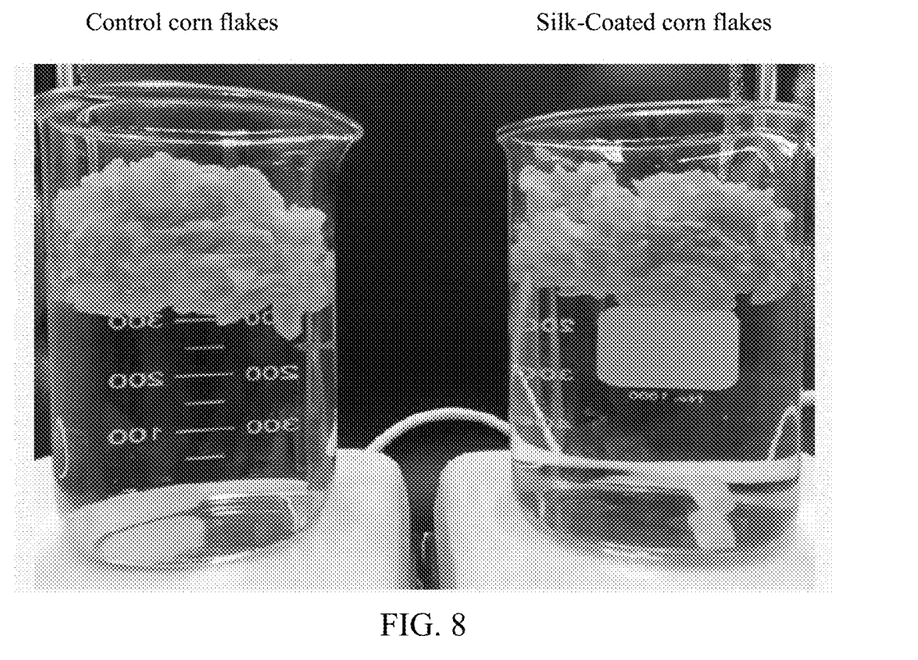
FIGS. 8-13 are a series of pictorial representations of control corn flakes and silk-coated flakes soaked in water with a stir bar to observe "bowl life" at various elapsed times, with FIG. 8 representing soaking for 0 minutes, FIG. 9 representing soaking for 5 minutes, FIG. 10 representing soaking for 10 minutes, FIG. 11 representing soaking for 20 minutes, FIG. 12 representing soaking for 40 minutes, and FIG. 13 representing soaking for 60 minutes.

Time lapse: The third experiment involved exposing the groups of corn flake cereal to water for 60 minutes and observing the results. The same amounts of corn flakes were placed in identical containers that contained the same amount of water with a rotating mixer placed in the bottom of the container, as seen in FIG. 8. FIGS. 8-13 show this process over the time lapse video taken during the experiment, which is represented by pictures at various time periods in the instant application. The control corn flakes are in the container on the left and the silk coated corn flakes are in the container on the right.

Figure 9:
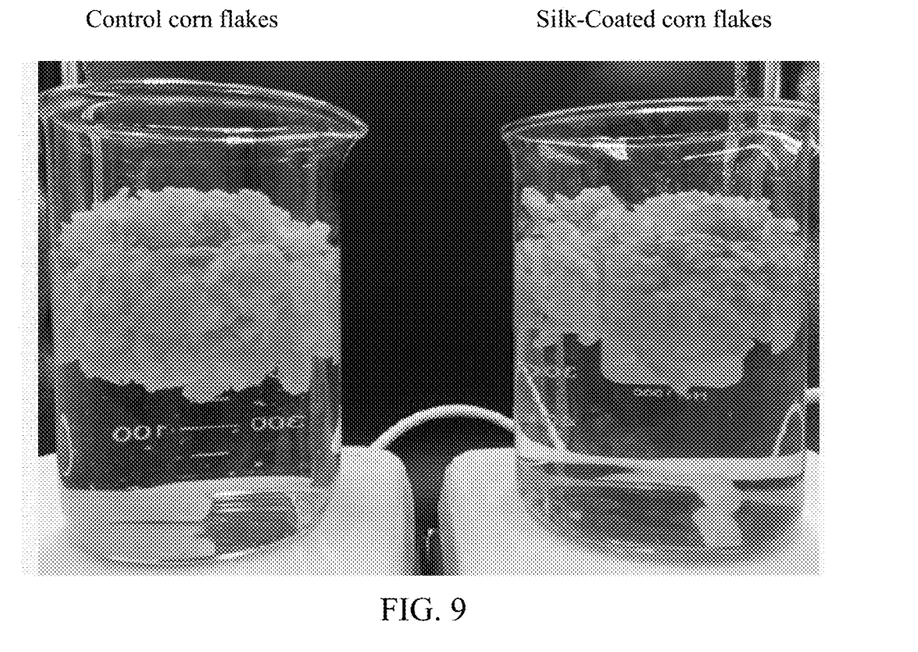
Figure 10:
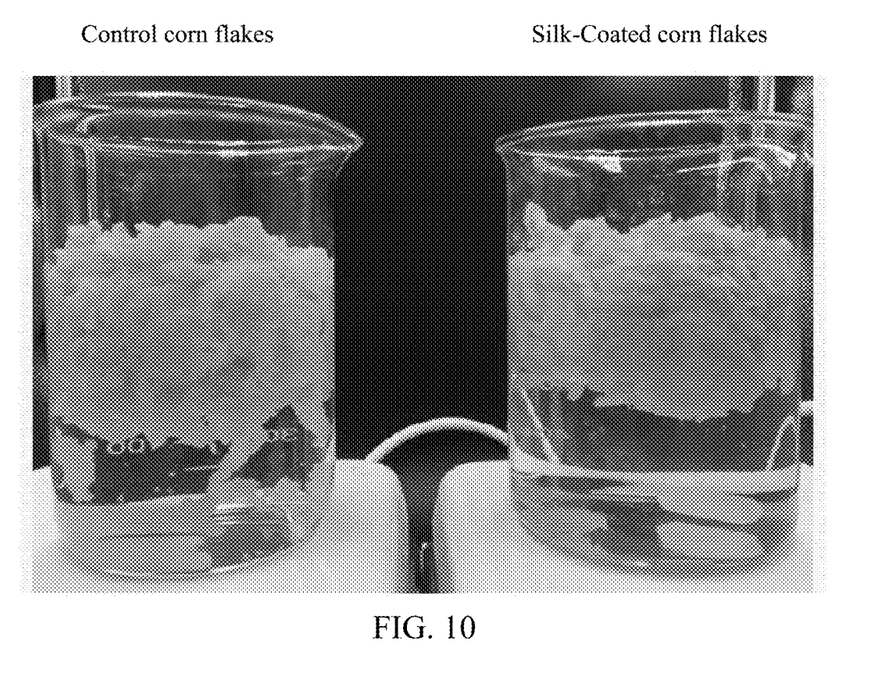
Figure 11:
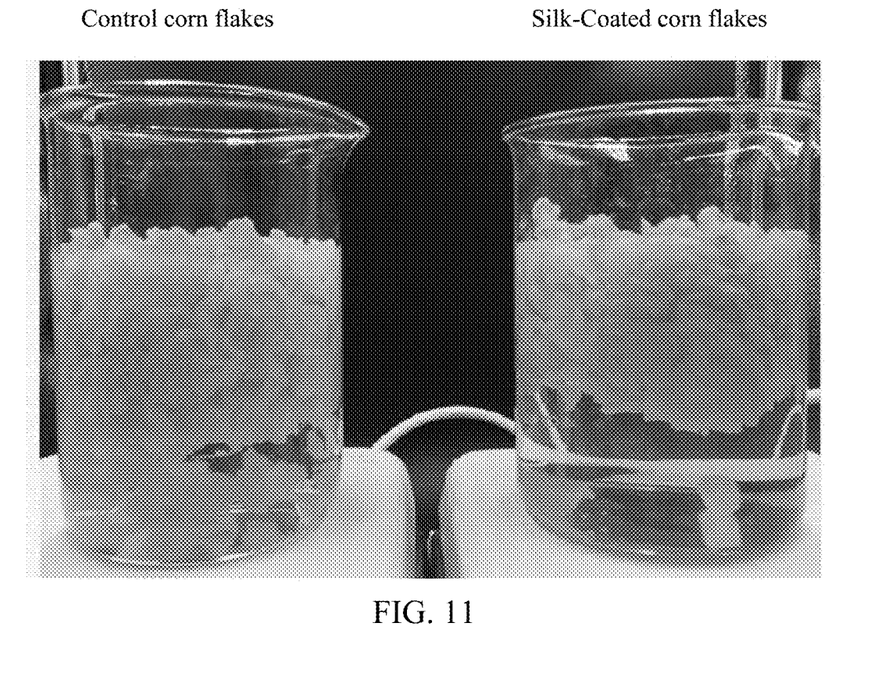
Figure 12:
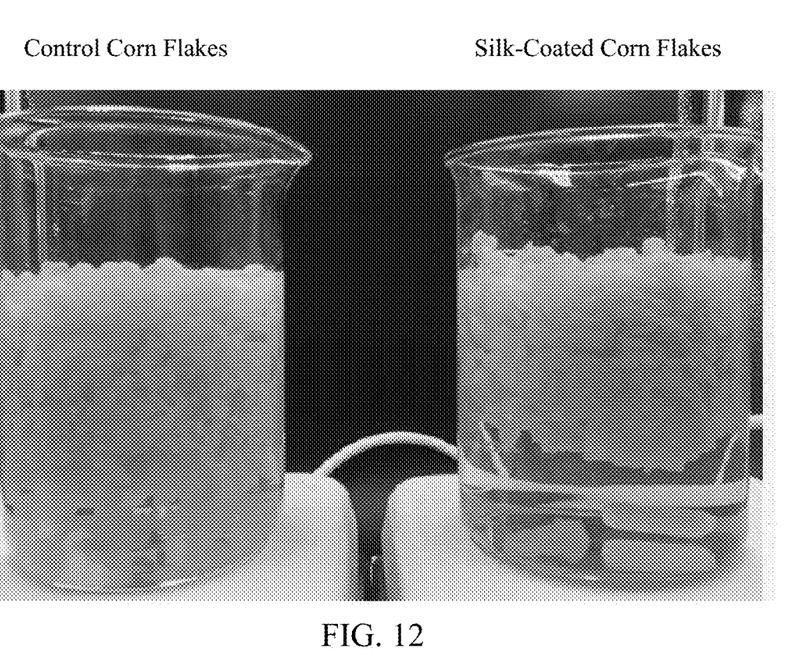
Figure 13:
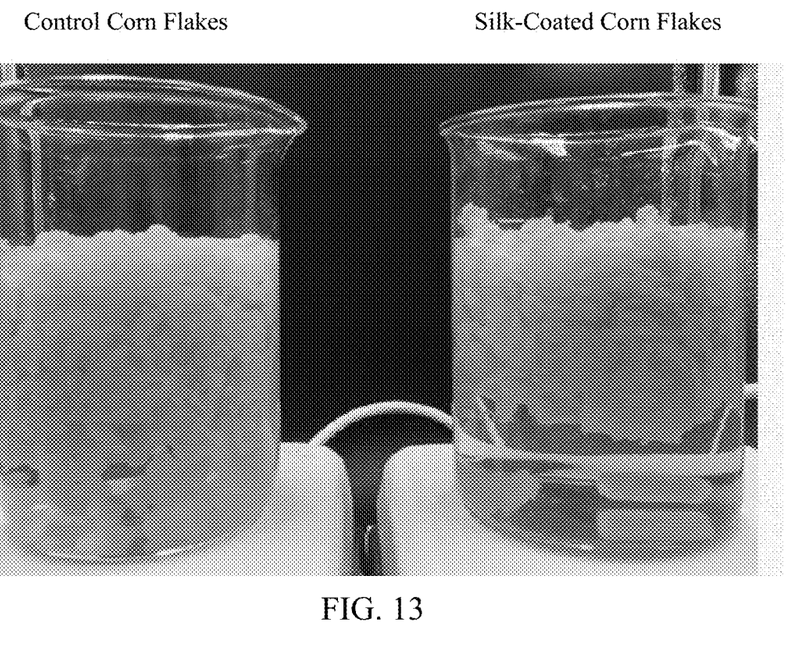

FIG. 8 shows the control and silk coated corn flakes after zero minutes of submersion into the water. The two groups show no discernable difference at this time period. FIG. 9 shows the control and silk coated corn flakes after five minutes of submersion into the water. The control corn flakes on the left have started to sink lower into the container as water is absorbed into the cereal. FIG. 10 shows the control and silk coated corn flakes after ten minutes of submersion into the water. The control corn flakes continue to sink lower into the water compared to the silk coated corn flakes as the cumulative effect of the water absorption manifests. FIG. 11 shows the control and silk coated corn flakes after twenty minutes of submersion into the water. At this point, the control corn flakes are beginning to fall to the bottom of the water, while the silk coated corn flakes are suspended in the top half of the water. FIG. 12 shows the control and silk coated corn flakes after forty minutes of submersion into the water. The control corn flakes are now fully submerged in the water and dispersed along its entire volume. In contrast, the silk coated corn flakes are suspended in the top half of the water still. FIG. 13 shows the control and silk coated corn flakes after sixty minutes of submersion into the water. The silk coated corn flakes still are not touching the bottom of the water after an entire hour.

As is clear, the control group began absorbing water more rapidly and sinking lower into the container than the silk coated group on the right. This continued throughout the entire 60-minute period, resulting in far fewer corn flakes sinking to the bottom of the silk coated container compared to the control container. This again exhibits the barrier properties of the silk coating and its ability to delay liquid absorption in the corn flakes.

There are multiple benefits to coating cereal with silk. As exemplified in the experiments above, the silk coating reduces the moisture absorption of cereal due to the increased barrier properties of the silk. This increases the bowl life of the cereal since it retains its initial physical properties, which permits the desired sensory experience for consumers even after soaking in a liquid. For example, by retaining the crispness of dry cereal after exposure to liquid, the silk coated cereal provides an improved crunch when a customer eats the cereal. Another benefit is that sweeteners (e.g., monosaccharides and disaccharides) can be reduced in cereal if it is coated with silk. Sweeteners, like sugar, are frequently used as a coating on cereal to create a barrier to liquid, such as milk. Silk can modify or replace this sweetener layer and allow cereal recipes to reduce the amount of sweetener present, which improves the nutritional profile of the cereal. For example, the sweetener could be reduced by at least 30%, 35%, 40%, 45%, 50%, 55%, 60%, 65%, 70%, 75% if silk fibroin is applied to cereal. Another benefit of a silk coating is the improved structural rigidity of the cereal. A silk coating provides an outer layer of support for the cereal in the presence of a liquid. This can be seen in FIG. 7, where the aggregate firmness of the flakes remains higher in the presence of a liquid. Further, this outer shell will reduce cereal breakage during manufacturing and transport so that a larger percentage of cereal will arrive to the consumer in one piece. Another benefit is the ability to use the silk coating to adhere other ingredients to the outside of cereal. For example, a manufacturer may desire to secure pieces of fruit, marshmallows, sprinkles, flavoring, etc. to the outside of a flake of cereal. By applying a silk coating to the cereal along with a flavoring, the silk can act like a glue to hold the flavoring to the outside of the piece of cereal. This equally applies to instances where different components of cereal or clusters are desired. For example, the silk coating could be used to help hold nuts or clusters of cereal together. Finally, the silk coating creates a barrier between the cereal and the outside environment. This improves the shelf life of the cereal because it reduces the transmission of water vapor and oxygen. If these transmission rates are controlled, the cereal will not go stale as quickly, nor will it take on water and become soggy in humid environments. Another benefit is that the packaging holding the cereal can be redesigned to account for the additional barrier properties of cereal. For example, the plastic lining accompanying cereal could be discarded entirely, made of a more environmentally friendly material, or made from a thinner layer of plastic that is more readily recyclable.

All types of cereals and ingredients within cereal can benefit from a silk coating. The following list of cereals that could be coated is exemplary and should not be deemed as limiting: flaked cereals (corn flakes, wheat flakes, rice flakes, extruded flakes, etc.); gun-puffed, including whole grain; extruded gun-puffed cereals; shredded cereals, including whole grain; extruded cereals; oven-puffed cereals; extruded expanded cereals; granola cereals, etc. Further, ingredients within cereals that are designed to be submerged in a liquid can benefit from a silk coating. For example, dried fruit, yoghurt, granola, nuts, or the like. This is particularly true where the ingredient is coated with sugar such that the sugar allows for a longer bowl-life of such ingredient. The recipe or ingredients used in cereal will not impact the usage of a silk coating, as it is applicable to all types of cereal and ingredients within cereal.

The silk coating can be applied to cereal using a number of different methods. For example, the silk coating could be applied as solution containing silk fibroin. This solution could be water based or any other suitable solvent that can placed on cereal. To create the silk solution, a powder of silk fibroin could be dissolved in a solution. In addition, the silk fibroin could be placed in a solution of a desired flavoring or additive to the cereal, such as a sweetened solution that is added to the outer layer of the cereal. In this sense, the silk fibroin could be added to any liquid solution that is already applied to the cereal in its recipe. As a further example, the silk fibroin could be added to the cereal in its powder form, such as in the dough during the manufacturing process.

A silk coating can be applied to cereal at many different steps of the manufacturing process. The following examples are exemplary in nature. For example, if a silk coating is applied to flaked cereals, the silk coating could be applied: during milling of the ingredients; after the milling step but prior to baking the cereal; after baking; during the coating step after baking, such as part of a sugary solution that is applied to the cereal. As another example, if a silk coating is applied to puffed cereals (puffed via gun, oven, etc.), the silk coating could be applied: as part of the dough; if extruded during or after extrusion prior to drying; after drying prior to the puffing step; after the puffing process, such as during the coating step. As further example, if a silk coating is applied to shredded cereal, the silk coating could be applied: to the ingredients prior to the shredding step; after a portion of the ingredients are shredded; after all of the ingredients are shredded; after the shredded ingredients are cut; after baking of the cereal; after baking of the cereal and prior to toasting; after toasting of the cereal; after baking and toasting of the cereal; during the coating step.

Many modifications and other implementations of the disclosure will come to mind to one skilled in the art to which this disclosure pertains having the benefit of the teachings presented in the foregoing descriptions and the associated figures. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A method of enhancing the performance of a flaked cereal by utilizing silk fibroin comprising:
   (A) obtaining the flaked cereal;
   (B) producing a coating liquid by modifying a recipe for a coating liquid that includes a sweetener, wherein the modification comprises substituting a silk fibroin-based input for a portion of the sweetener, where the silk fibroin-based input was derived from a cocoon created by a *Bombyx mori* silkworm, wherein a flaked cereal coated with the coating has a firmness measurement;
   (C) coating the flaked cereal with the coating liquid to create a coated flaked cereal, wherein the coated flaked cereal coated with the coating liquid has a firmness measurement that is at least the same as or greater than the firmness measurement of the flaked cereal coated with the coating liquid, wherein the firmness measurements are taken after their respective flaked cereals have been submerged in a cool liquid for sixty seconds; and (D) drying the coated flaked cereal to cure the coating liquid.

2. The method of claim 1, wherein after submersion in the cool liquid for sixty seconds, a translucency of the flaked cereal coated with the coating liquid is less than a translucency of the flaked cereal coated with the coating liquid and the flaked cereal coated with the coating liquid sink in the cool liquid at a faster rate than the flaked cereal coated with the coating liquid.

3. The method of claim 1 further comprising the step of distributing the dried coated flaked cereal into packaging for sale.

4. The method of claim 1, wherein the sweetener is a monosaccharide, a disaccharide, an oligosaccharide, a polysaccharide, or a combination thereof.

5. The method of claim 1, wherein the drying step comprises baking the coated flaked cereal in an oven.

6. The method of claim 1, wherein the flaked cereal further comprises dried fruit, yogurt, granola, nuts, or a combination thereof.

7. The method of claim 1, wherein the coating step comprises applying the coating liquid in a drum.

8. A method of enhancing the performance of a cereal product and reducing the glycemic index of the cereal product by utilizing silk fibroin comprising:

(A) obtaining the cereal product;
(B) producing a coating liquid by modifying a recipe for a coating liquid that includes a sweetener, wherein the modification comprises substituting a silk fibroin-based input for a portion of the sweetener, where the silk fibroin-based input was derived from a cocoon created by a *Bombyx mori* silkworm, wherein a cereal product coated with the coating has a physical property;
(C) coating the cereal product with the coating liquid to create a coated cereal product, wherein the coated cereal product has an improved physical property that can be measured after submersion in a cool liquid for sixty seconds, wherein the improved physical property comprises at least one of:
  a firmness measurement that is at least the same as or greater than the firmness measurement of a cereal product coated with the coating liquid,
  a translucency that is less than a translucency of the cereal product coated with the coating liquid, or
  a sink rate that is less than a sink rate of the cereal product coated with the coating liquid; and
(D) drying the coated flaked cereal to cure the coating liquid.

9. The method of claim 8 further comprising the step of distributing the dried coated cereal product into packaging for sale.

10. The method of claim 8 wherein the cereal product comprises one or more of wheat, rice, maize, oat, barley, rye, millet, and sorghum.

11. The method of claim 8, wherein the cereal product comprises a flaked cereal product.

12. The method of claim 8, wherein the cereal product comprises a puffed cereal product.

13. The method of claim 8, wherein the cereal product comprises a shredded cereal product.

14. The method of claim 8, wherein the flavoring is a monosaccharide, a disaccharide, an oligosaccharide, a polysaccharide, or a combination thereof.

15. The method of claim 8, wherein the cereal product further comprises dried fruit, yogurt, granola, nuts, or a combination thereof.

16. The method of claim 8, wherein the drying step comprises baking the coated cereal product in an oven.

17. The method of claim 8, wherein the coating step comprises applying the coating liquid in a drum.

18. A method of enhancing the performance of a flaked cereal by utilizing silk fibroin comprising:

(A) obtaining the flaked cereal;
(B) producing a coating liquid by modifying a recipe for a coating liquid that includes a sweetener, wherein the modification comprises substituting a silk fibroin-based input for a portion of the sweetener, where the silk fibroin-based input was derived from a cocoon created by a *Bombyx mori* silkworm, wherein a flaked cereal coated with the coating has a physical property;
(C) coating the flaked cereal with the coating liquid to create a coated flaked cereal, wherein the coated flaked cereal has an improved physical property that can be measured after submersion in a cool liquid for sixty seconds, wherein the improved physical property comprises at least one of:
  a firmness measurement that is at least the same as or greater than the firmness measurement of a flaked cereal coated with the coating liquid,
  a translucency that is less than a translucency of the flaked cereal coated with the coating liquid, or
  a sink rate that is less than a sink rate of the flaked cereal coated with the coating liquid; and
(D) drying the coated flaked cereal to cure the coating liquid.

19. The method of claim 18 further comprising the step of distributing the dried coated flaked cereal into packaging for sale.

20. The method of claim 18, wherein the coating step comprises applying the coating liquid in a drum.

21. The method of claim 18, wherein the drying step comprises baking the coated flaked cereal in an oven.

22. The method of claim 18, wherein the sweetener is a monosaccharide, a disaccharide, an oligosaccharide, a polysaccharide, or a combination thereof.

23. The method of claim 18, wherein the flaked cereal further comprises dried fruit, yogurt, granola, nuts, or a combination thereof.

* * * * *